US006538736B1

(12) United States Patent
Palumbo (10) Patent No.: US 6,538,736 B1
(45) Date of Patent: Mar. 25, 2003

(54) CONCENTRIC SPECTROMETER WITH MITIGATION OF INTERNAL SPECULAR REFLECTIONS

(75) Inventor: Perry A. Palumbo, Ft. Collins, CO (US)

(73) Assignee: Hach Company, Loveland, CO (US)

( * ) Notice: Subject to any disclaimer, the term of this patent is extended or adjusted under 35 U.S.C. 154(b) by 265 days.

(21) Appl. No.: 09/705,990

(22) Filed: Nov. 3, 2000

Related U.S. Application Data
(60) Provisional application No. 60/167,491, filed on Dec. 1, 1999.

(51) Int. Cl.[7] .................................................. G01J 3/28
(52) U.S. Cl. ........................................ 356/326; 356/328
(58) Field of Search ................................ 356/326, 328, 356/330, 331, 332, 334

(56) References Cited

U.S. PATENT DOCUMENTS 5,995,221 A * 11/1999 Slutter et al. ............... 356/326

FOREIGN PATENT DOCUMENTS

WO       WO 01/40746 A1 *  6/2001  ............. G01J/3/02

* cited by examiner

Primary Examiner—Karl D. Frech
(74) Attorney, Agent, or Firm—Dean P. Edmundson (57) ABSTRACT

Concentric spectrometers are plagued with internal reflections due to inherent nature of more than one optical surface possessing a common center of curvature. Reflections from optical surfaces arise when there is a difference or change in the refractive index of the media in which an optical beam or ray of a given wavelength is propagating. Internal reflections in concentric optical systems can produce a myriad of undesirable optical phenomenon at the image plane such as multiple images of an object, interference fringes, and stray light. As a result a loss in contrast or detection limit arise from such phenomenon in which light or detectable radiation that impinges on the image plane does not add to the formation of the intended image, (stray light). The present invention produces high quality images without the optical phenomenon(s) that arise from internal reflections by removing the reflected radiation from propagating through the optical system.

19 Claims, 7 Drawing Sheets prior art
FIG. 1 prior art
FIG. 2 prior art
FIG. 3 prior art
FIG. 4 prior art
FIG. 5 prior art
FIG. 6 prior art
FIG. 7 prior art
FIG. 8 prior art
FIG. 9

CONCENTRIC SPECTROMETER WITH MITIGATION OF INTERNAL SPECULAR REFLECTIONS

CROSS-REFERENCE TO RELATED APPLICATION

This application is based upon, and claims the benefit of, my Provisional Application Ser. No. 60/167,491, filed Dec. 1, 1999.

FIELD OF THE INVENTION

The present invention relates generally to spectrometers and spectrographs having optical elements in which the surfaces of the said elements include a common center of curvature. More specifically the invention pertains to a Dyson, "unit magnification optical system without Seidel aberrations", which includes concentric spectrometers and concentric spectrographs in which the Dyson optical system is applied.

BACKGROUND OF THE INVENTION

Concentric optical systems such as described by J. Dyson, JSOA, "Unit Magnification . . . Aberrations", Vol. 49, No. 7, pp.713–716, provide large image fields free of Seidel aberrations and are thus able to form images of high quality and resolution. This optical arrangement has been applied to advantage by L. Mertz, Applied Optics, "Concentric Spectrographs", Vol. 16, No. 12, pp. 3122–3124, and W. Slutter (EP 0 862 050 A2; 1998) to spectrometers and spectrographs to produce high quality spectral dispersion of optical energy.

Internal reflections of light on optical surfaces can degrade the quality of the image formed at the image aperture. The image can be degraded in a myriad of optical phenomenon as a result of internal reflections. On example of degradation is by the formation of multiple images of the object at the image aperture. Another example of degradation caused by internal reflections is the formation of interference fringes at the image aperture. Still another example in which the quality of the image may be degraded is in the loss of contrast or detection limit when reflected light from an optical surface impinges out of focus at the image aperture and does not contribute to the formation of the image of the object. The object in spectrometers is typically the entrance slit or entrance aperture through which the optical energy to be analyzed enters the spectrometer.

In a concentric spectrometer of the Dyson optical configuration, there are two specular surface reflections that contribute to, or give rise to, internal reflections. Both reflections originate at the convex surface of the plano-convex lens, which lies concentric to a concave diffraction grating. The first reflection occurs when light transmitted from the object plane falls incident on the convex surface of the lens and the second occurs when the diffracted light from the grating impinges on said convex surface. Either one or both of these reflections can degrade the image quality of the spectrometer.

The effects of internal reflections have been reduced in the prior art by the deposition of various antireflection coatings on the optical surfaces within the concentric spectrometer. An antireflective coating(s) may be applied to optical surfaces to reduce the differential change in refractive index when the ray propagates from one optical media such as air, to a second optical media of different refractive index such as glass, thus reducing the magnitude of the specular reflection. Many examples of coatings on optical surfaces exist that reduce the magnitude of reflections on optical surfaces. Indeed a great amount of literature has been devoted to the study of single, and multiple, layer depositions that reduce reflections on optical surfaces.

A high performance antireflection coating(s), usually a multi-layer dielectric coating that substantially reduces the reflection at a surface, has inherent disadvantages. The disadvantages include a high cost of production, a narrow range of wavelengths for which the reflection loss is low, limited angles of incidence in which rays may propagate with low reflection, and are fragile requiring special handling, cleaning and environmental considerations. Indeed, these high performance coatings can cause a greater magnitude of reflection than a surface without an antireflective coating when used beyond the wavelength range of design. Regardless of the coating(s) used, the internal reflections are not reduced over a wide wavelength range to a level which degradation of the image quality does not take place by one or more of the aforementioned optical phenomenon within concentric optical systems.

Another means in which internal reflections have been reduced in concentric spectrometers is by the reduction of the numerical aperture (NA) of the spectrometer. One way the NA of the spectrometer can be reduced is by the placement of an optical stop within the spectrometer. This is undesirable since the result is a loss in detectable signal, a decrease in the etendue or throughput of the optical system, and can add to or increase the stray light within the spectrophotometer since more energy must be absorbed within the confines of the spectrometer.

There is a need, therefore, for the mitigation of internally reflected light within a concentric spectrometer such that no degradation of the image quality or loss in contrast occurs yet high etendue is preserved.

SUMMARY OF THE INVENTION

The present invention overcomes the limitations of internal reflections in concentric spectrometer optics by mitigation of the specular reflected rays from propagating through the optical system. As a result, the quality of image at the detection or image plane is preserved while maintaining high etendue.

In accordance with the present invention an object and an image aperture are provided, through which optical radiation, or light, enters the spectrometer through said object aperture and a spatially dispersed image of said object aperture by wavelength is formed at said image aperture. The field or extent of the object and image apertures along with the focal ratio of the optical system defines the limit within which light may propagate the optical system. Rays that propagate the system at the limit of the aperture fields are the marginal rays.

A concave diffraction grating is provided that reflects and diffracts incident light from an object(s) from the object plane and participates in the formation of a spatially dispersed image of the object(s) by wavelength at the image plane. A plano-convex lens is provided through which light from the object plane is transmitted to the diffraction grating, where the light it is diffracted and reflected, then transmitted again through the same plano-convex lens to form a spectrally dispersed image of the object within the image plane. The convex surface of the lens and concave surface of the diffraction grating are concentric, or nearly so, about a common center of curvature. An optical axis is also provided that includes the center of curvature of the optical elements and extends through the mechanical axis of both the lens and diffraction grating. A radial distance is defined from the optical axis that includes both object and image apertures.

Meridional planes, which include the optical axis, are defined to be perpendicular to the x-y path of a given diffracted ray as that ray propagates from the grating towards the convex surface of the lens. A diffracted ray that falls incident on the convex lens surface of the lens will give rise to specular reflection. A ray that falls incident on the convex lens surface prior to intersection of the rays' meridional plane will cause the specular reflection to be directed to impinge on the grating a second time. This ray can further propagate the optical system by means of zero order diffraction to form a spectra or part of a spectra within the image aperture which does not correlate to the spectra of interest. The result is an increase in stray light. A diffracted ray that intersects the rays' meridional plane prior to impinging on the convex lens surface will cause the specular reflection to be directed away from the diffraction grating and image plane without possibility of secondary reflection or diffraction. A baffle or series of baffles and or surfaces containing light absorbing media can be used accordingly to prevent further propagation within the spectrometer without interference with the optical path of the spectrometer. The present invention excludes the possibility of the diffracted rays from impinging on the surface of the convex lens without prior intersection of the meridional plane, thus eliminating further propagation of internal specular reflections.

Another aspect of the invention is the use of baffles which need only prevent propagation of light from one direction since secondary diffraction or reflection does not occur on the grating surface. The baffles can therefore be optimized to more completely mitigate stray light by multiple impingement of the reflected light on the absorbing media or baffles to further reduce the total stray light within the spectrometer.

Further in accordance with the present invention, marginal rays extending from the object aperture toward the optical axis are not permitted to intersect the optical axis prior to the convex surface of the lens as internal reflections will result. Furthermore, marginal rays that extend away from the optical axis define the clear aperture of the optical system.

Another feature of the present invention is an aperture mask placed in close proximity to the concave surface of the grating. This aperture mask limits the NA of the spectrometer and additionally reduces stray light in the spectrometer. The edge or near periphery of the grating is typically not of optical quality. The edge of a grating is usually chamfered to decrease the frailty of the grating but can have the undesirable effect of scattering light towards image aperture. Also, the optical surface beyond the clear aperture of the grating includes defects from the replication or manufacturing processes. Thus an aperture mask provides a surface that is absorbent to light, serves to limit the NA of the spectrometer, and masks that region beyond the clear aperture of the grating to prevent the scattering of light towards the image aperture.

Further in accordance with the current invention, the object and image apertures lie in parallel or coincident plane(s) in close proximity to, or are included within, the planar surface of the plano-convex lens. The thickness of the plano-convex lens and lens radii, separation of the convex surface of the lens and concave surface of the diffraction grating, radii of the diffraction grating, and grating groove density are concurrently adjusted to minimize aberrations within the spectrometer apertures and provide the desired spatial dispersion. Furthermore, the radial distance from the optical axis at which the object and image apertures reside and the diameters of the lens, grating, and aperture mask are adjusted in accordance with the invention to provide the desired numerical aperture for the spectrometer while eliminating internal reflections.

DETAILED DESCRIPTION OF THE PREFERRED EMBODIMENT

Referring to FIGS. 10–14 there is shown a concentric spectrometer of Dyson optical configuration with mitigation of internal reflections in the preferred embodiment of the present invention. Prior art systems pertaining to spectrometer designs are shown in FIGS. 1–9.

Figure 1:
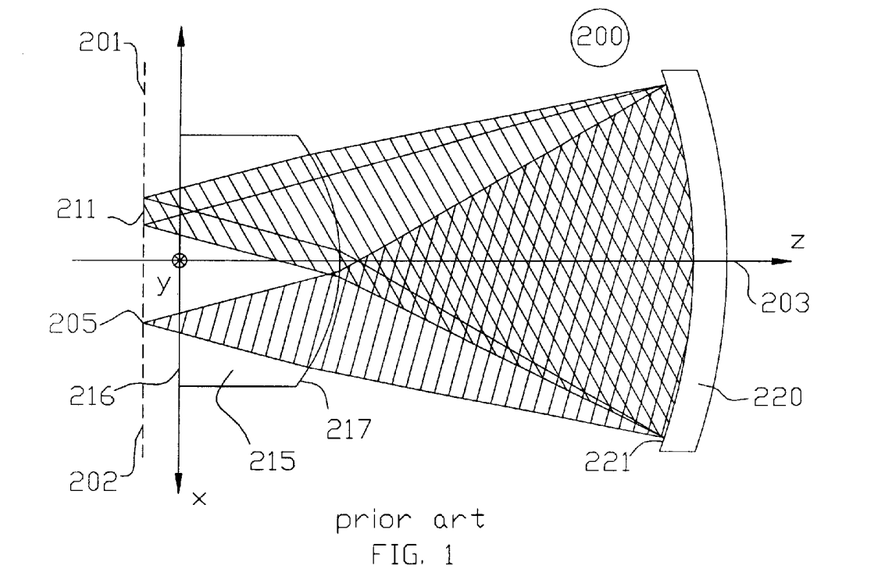
FIG. 1 is a top plan view (x-z plane) of a known modified concentric spectrograph with object and image apertures not included within the dispersion axis.
Figure 2:
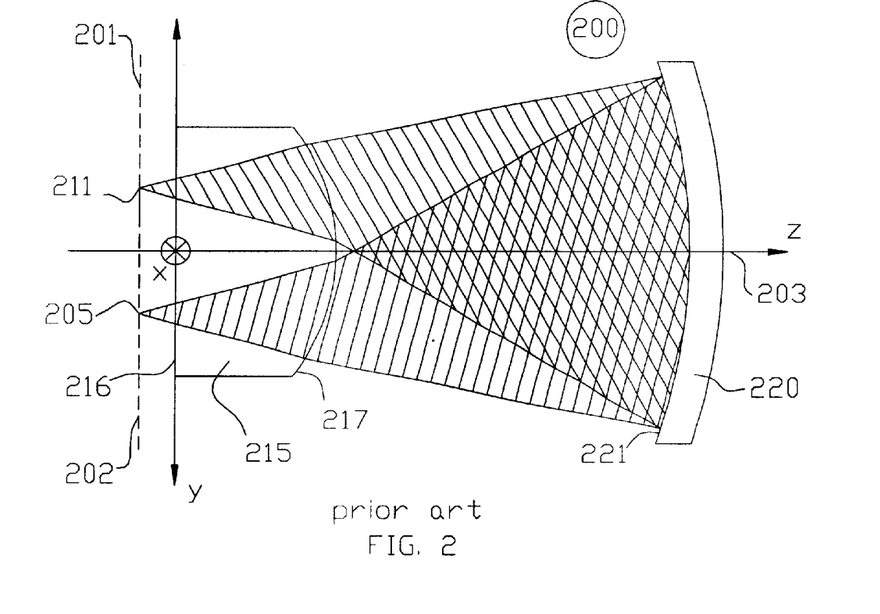
FIG. 2 is a side view (y-z plane) of FIG. 1.

Shown in FIGS. 1 and 2 is a modified concentric spectrometer 200 with shown object aperture 205, and image aperture 211. A plano-convex lens 215 with planar surface 216 and convex surface 217 are shown. The diffraction gating 220 with dispersion surface 221 is positioned at a distance along the optical axis 203 such that convex surface 217 of lens 215 are concentric or nearly so. Object aperture 205 is coincident with object plane 202 through which light enters spectrometer 200 where upon light is refracted by lens 215 to substantially fill grating surface 221. Light is diffracted by grating surface 221 per known grating equation $kn\lambda = \sin \alpha + \sin \beta$, where k is the groove density of the grating, n is the order of diffraction, $\lambda$ is the wavelength of incident light, $\alpha$ is the angle of incident, and $\beta$ the angle of diffraction. Diffracted light propagates through lens 215 towards image plane 201 where a spectral image is formed within image aperture 211 where said spectra 206 may be detected as a spatial dispersion of light vs. wavelength in FIG. 3. When the order of diffraction is zero, n=0, the angle of incidence is equal to the angle of dispersion and a reflection takes place. For a given dispersion several orders of diffraction are present, positive, negative, and zero. The zero order 210 image of object aperture 205 is shown relative optical axis 203 as reference to the n=1 order of diffraction. Meridional plane 225 containing optical axis 203 is defined perpendicular to grating grooves of grating surface 221 and separates object aperture 205 from image aperture 211. Object aperture 205 is disposed at distance 272 from meridional plane 225 so as to prevent a reentrance of diffracted light by image aperture 211.

Figure 6:
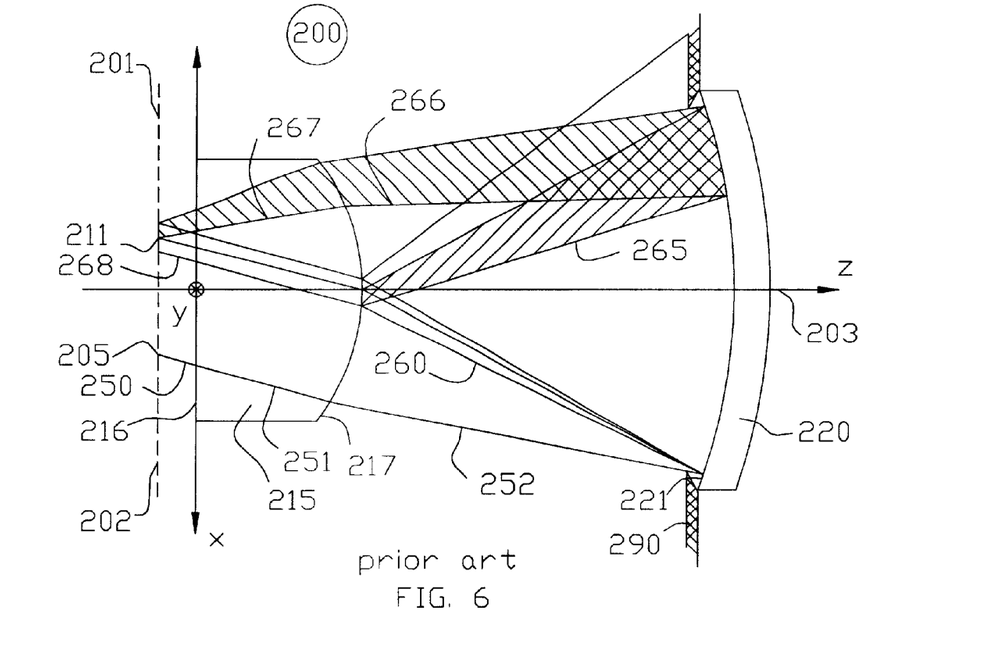
FIG. 6 is a top plan view (x-z plane) of FIG. 1 with non-restrictive aperture stop and showing path of internal reflection.
Figure 7:
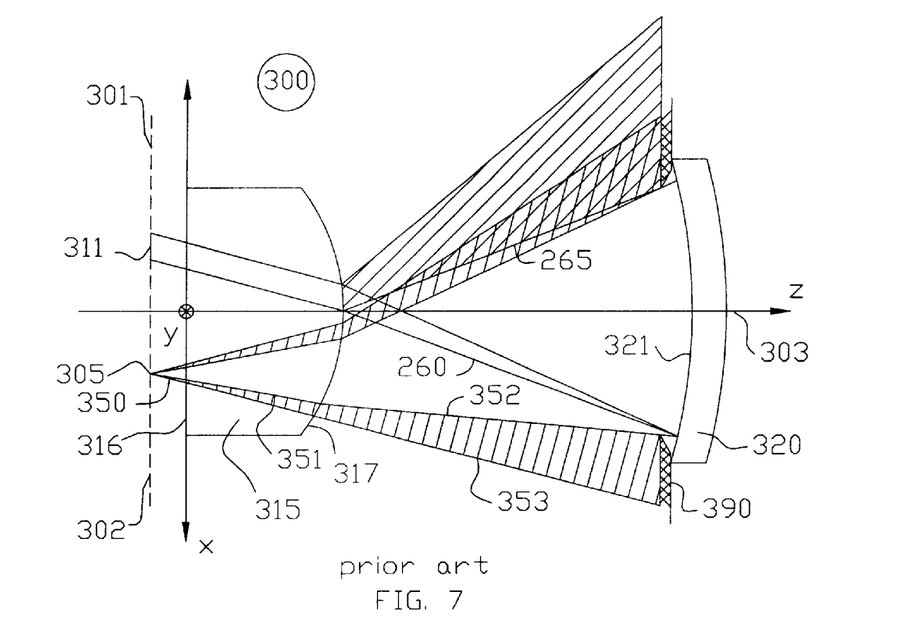
FIG. 7 is a top plan view (x-z plane) of FIG. 6 with aperture stop in position that eliminates internal reflections.

A modified concentric spectrometer 200 has several undesirable qualities, which degrade the purity of the spectra and limits the detectable range of the spectrometer due to stray light. The cause of this degradation in performance is due to internal reflections between the convex surface 217 of lens 215 and grating surface 221. An internal reflection known to contribute to stray light within image aperture 211 is illustrated in FIG. 6 showing formation and path of reflection. Light to be analyzed enters the spectrometer through object aperture 205 and propagates along ray path 250 to planar surface 216 of lens 215. The ray proceeds along path 251, 252 to impinge on grating surface 221. At grating surface 221 the ray is diffracted by angle vs. wavelength. For a given wavelength ray 260 proceeds to lens surface 217 where a portion of the light is reflected along path 265 and the remaining light is transmitted through lens 215 as ray path 268 towards image aperture 211. Some of the reflected rays 265 impinge on the grating a second time and are reflected in accordance with a zero order of diffraction per diffraction equation as rays 266. The zero order rays 266 of the second incidence on diffraction grating surface 221 proceed through lens 215 along ray path 267 to impinge within image aperture 211 creating a second partial image of the primary spectra 206. This partial spectrum is not spatially correlated to primary spectra 206 and prevents detection of specific wavelengths for which gives a spectrometer utility in the field of atomic absorption spectroscopy. Diffracted rays 260 from grating surface 221 follow a x-y path towards convex lens surface 217 and impinge on the lens surface 217 within area 250. For a given x-y ray path a meridional plane, a plane of reflection 236, is defined to include optical axis 203 and be perpendicular to x-y line of propagation shown in FIG. 3. Specular reflections contribute to unwanted partial spectral images when the plane of reflection 236 dissects surface area 250 of convex lens surface 217, identified as area 251 in FIG. 3.

Figure 4:
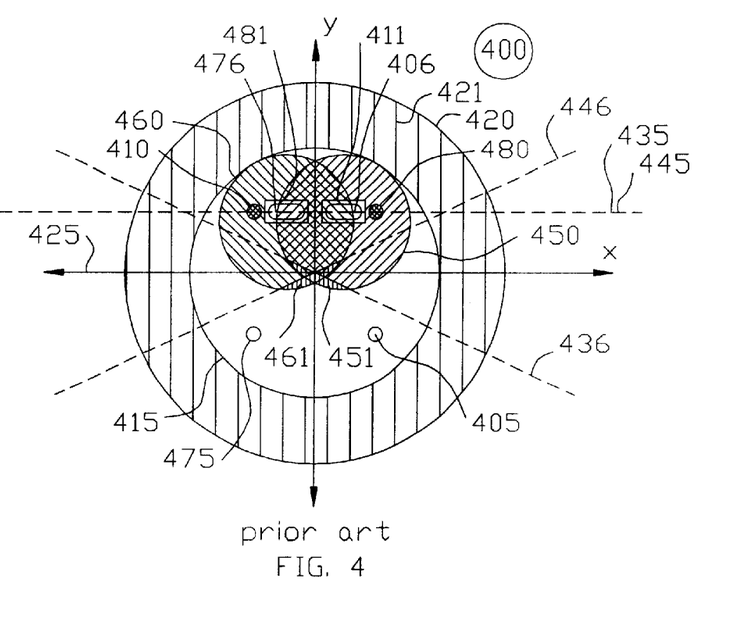
FIG. 4 is an axial view (x-y plane) of a known modified concentric spectrograph showing two object and image apertures.
Figure 5:
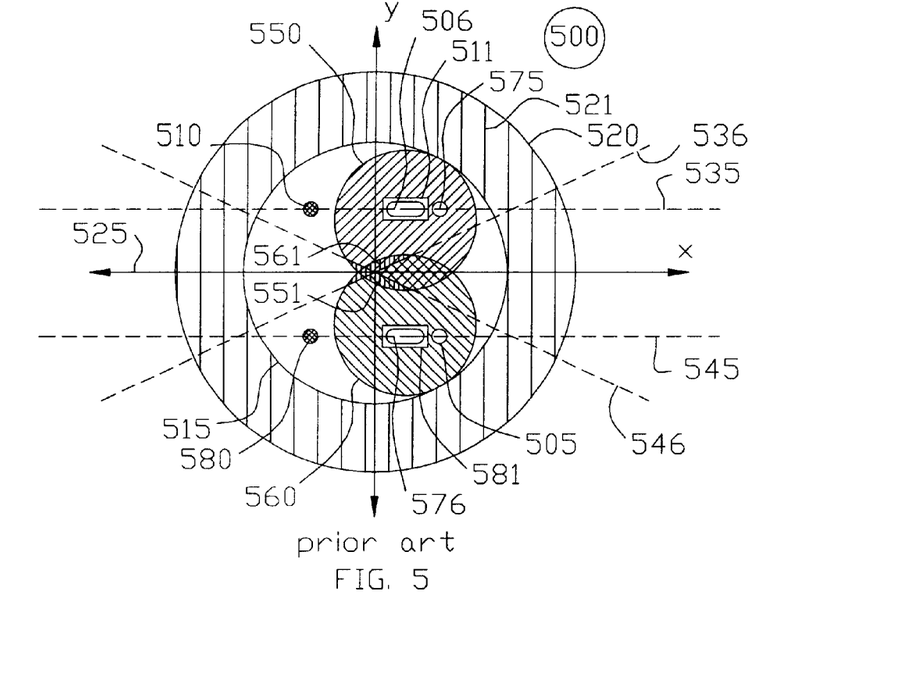
FIG. 5 is an alternative arrangement, axial view (x-y plane), of a known modified concentric spectrograph with two object and image apertures.

A modified concentric spectrometer of known prior art, Dyson configuration, may include more than one object and image aperture as shown in FIGS. 4–5. Light enters the spectrometer through object aperture 405(505) and 475 (575), transmitted through lens 415(515) towards concave grating surface 421(521) of grating 420(520). Image apertures 411 and 481 are located on the same side of meridional plane 425 through which primary spectra 406 and 476 of object aperture 405 and 475 are imaged. Image apertures 511 and 581 are on different sides of meridional plane 525 through which primary spectra 506 and 576 of object aperture 505 and 575 are imaged. Zero order images of object apertures 405(505) and 475(575) are shown relative to the optical axis as 410(510) and 480(580) respectfully. The axis of dispersion 435 and 445 for spectra 406 and 476 may be coincident so as to make possible that both spectra be incident on a single detector. The dispersion axis 535 of spectra 506 and dispersion axis 545 of spectra 576 are disposed on different sides of meridional plane 525 to provide greater separation of the two spectra so as to provide additional space independent detection means.

Regardless of the number of object or image planes or spatial arrangement, internal reflections can occur if surface areas 450(550), 460(560) of lens 415(515) are dissected by planes of reflection 436(536), 446(546) respectfully. Specular reflections from convex lens surface within sections 451(551) and 461(561) contribute to the formation of unwanted partial spectral images degrading the performance of the spectrometer. Another disadvantage of the prior art dual arrangements is the object apertures 405(505) and 475(575) are placed at a different distance from the optical axis 403 than the image apertures 411(511) and 481(581). The nonsymmetrical arrangement of apertures about the optical axis 403 degrades image quality of spectra 406(506) and 476(576).

Figure 3:
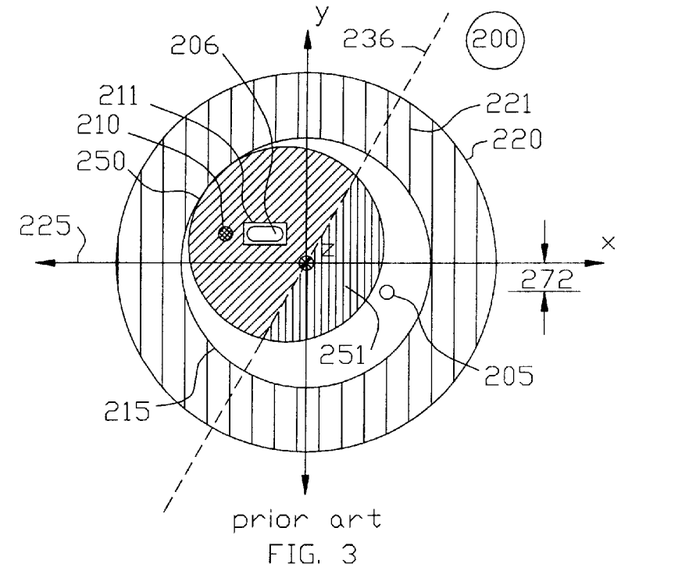
FIG. 3 is an axial view (x-y plane) of FIG. 1 looking through the planar surface of the lens toward the diffraction grating.

Aperture stops have long been used in as a means of controlling aberration and limiting the NA of optical systems. An example of an aperture stop 290 used in prior art modified concentric spectrometer is shown in FIG. 3 and FIG. 6. The aperture stop 290 in FIG. 6 limits the NA of the spectrometer but does not prevent internal reflections from impinging on grating 220 and resulting in subsequent degradation in quality of primary spectra 206 of FIG. 3. The size of the aperture stop 390 of FIG. 7 through which light is permitted to pass can be decreased in a modified concentric spectrometer to prevent internal reflections from the convex surface 317 of lens 315 from impinging on grating surface 321 of grating 320. Light enters the modified spectrometer through object aperture 305 of object plane 302 along ray path 350. Ray path 350 is transmitted through the planar surface 316 lens 315 along ray path 351 to convex lens surface 317. Light is refracted by lens 315 and impinges on concave grating surface 321 where the said light is diffracted towards lens surface 317. A significant portion of the usable light 353 that would contribute to the formation of the primary spectra 306 within image aperture 311 is prevented from doing so by aperture stop 390. The result of this obscuration creates a situation by which the gain of the detection means must be increased to account for the decrease in intensity of the spectra.

Figure 8:
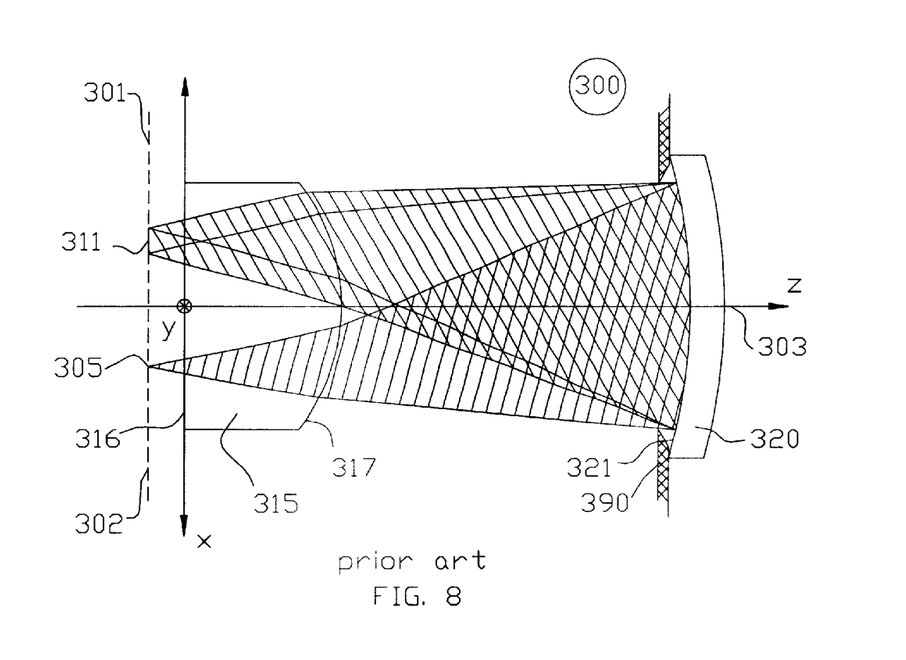
FIG. 8 is a top plan view (x-z plane) of FIG. 7 with reduced numerical aperture.
Figure 9:
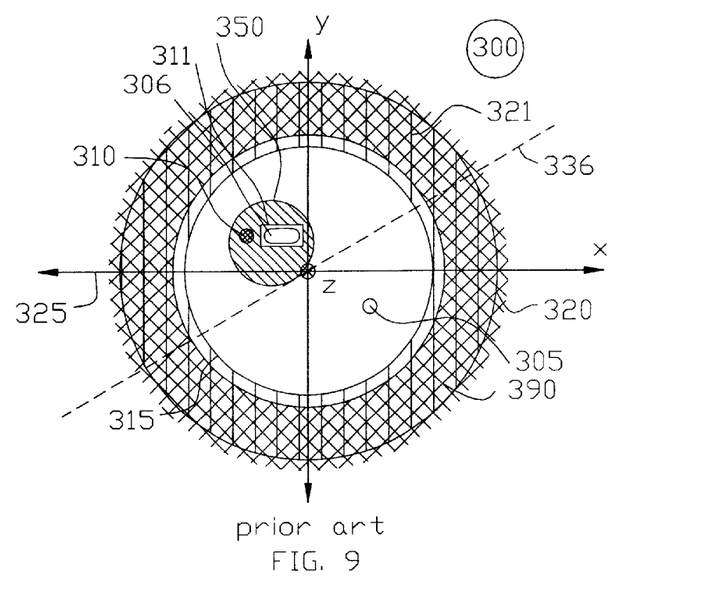
FIG. 9 is an axial view (x-y plane) of FIG. 7 with reduced numerical aperture.
Figure 10:
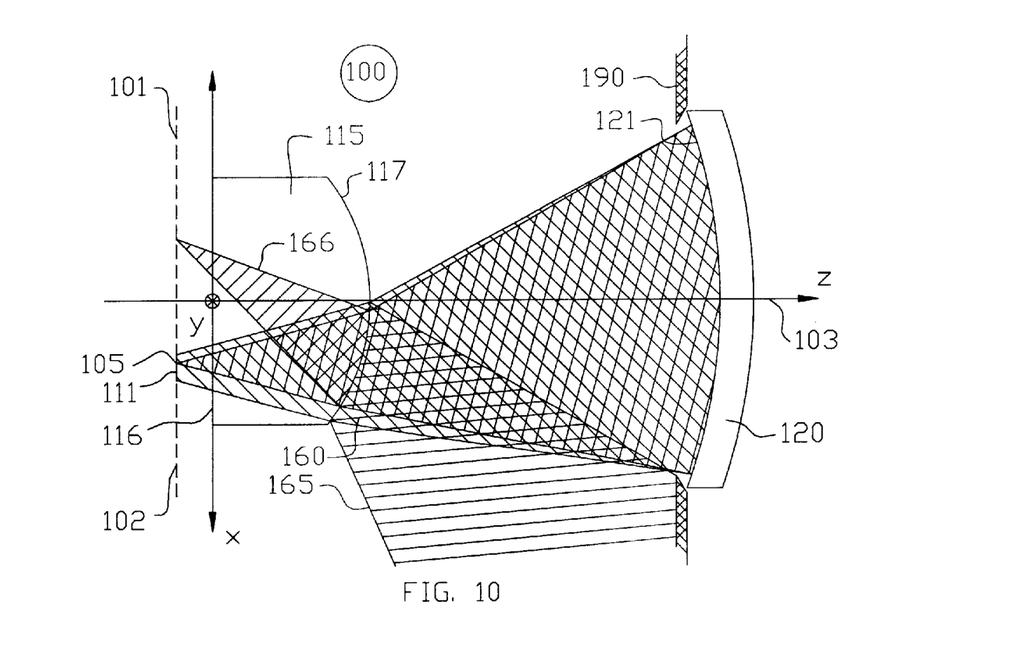
FIG. 10 is a top plan view (x-z plane) of the preferred embodiment of the present invention.
Figure 11:
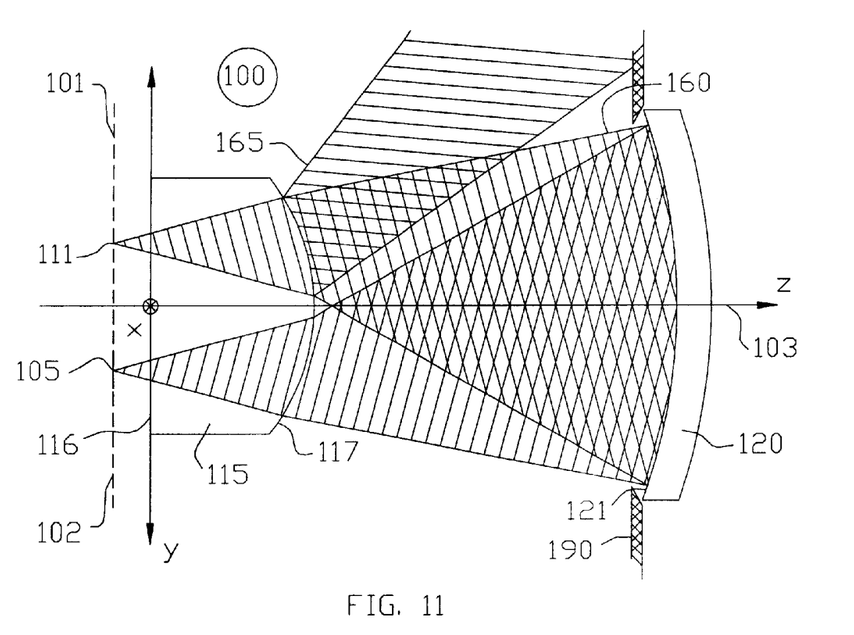
FIG. 11 is a side view (y-z plane) of a preferred embodiment.
Figure 12:
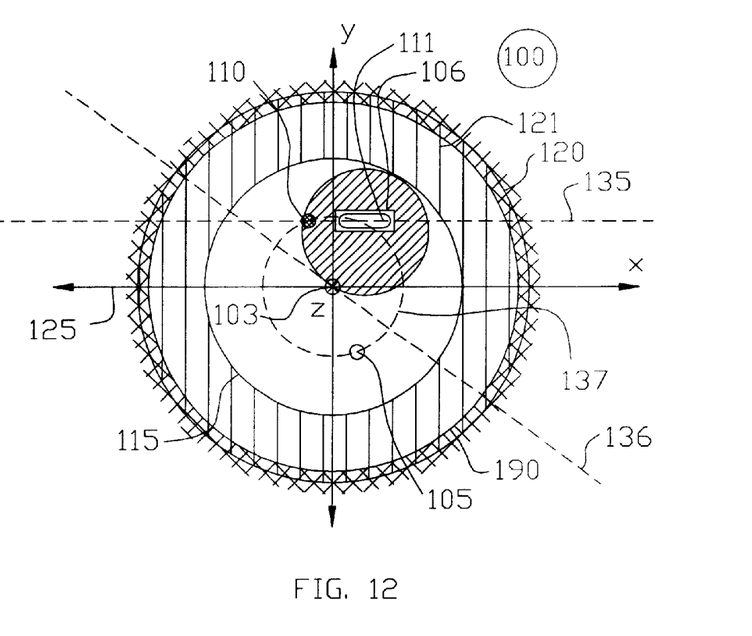
FIG. 12 is an axial view (x-y plane) of FIG. 11 preferred embodiment.

Obscuring entrant polychromatic light within a spectrometer also increases the amount of stray light generated by scattering of light off of aperture stop 390. This results in an undesirable decrease in contrast or increase in the signal to noise ratio, thus limiting the detection range even though the reflection 365 has been eliminated by aperture stop 390. The reduced NA of the spectrometer is best illustrated in FIG. 8 and FIG. 9. The grating 320 is obscured by aperture stop 390 permitting light to impinge on grating surface 321 within the opening aperture stop 390. Diffracted light impinges on the lens surface 317 in area 350 all on side of reflection plane 336 that does not contribute to internal reflections at the expense of a significant reduction in etendue as compared to same area 250 of FIG. 3.

The problems of modified concentric spectrometers (i.e., stray light due to internal reflections, stray light due to obscuration of entrant light, stray light due to defects of the grating surface beyond the clear aperture, partial non-correlated spectra, diminished etendue) have been solved in this invention in a concentric spectrometer that mitigates internal specular reflections. Light enters a specular mitigating concentric spectrometer 100 through object aperture 105 of object plane 102 of FIG. 10 and FIG. 11. Within the object aperture 105 may be disposed a plurality of entrant ray paths each of which can be dispersed to form individual spectra of each polychromatic entrant ray path within image aperture 111 of image plane 101.

In accordance with the present invention, object plane 102 and image plane 101 need not lie in coincident space and may be displaced from planar surface 116 of plano-convex lens 115. Further in accordance with the present invention, a Dyson optical configuration including a convex surface 117 of lens 115 and concave surface 121 of diffraction grating 120 are separated along optical axis 103 at a distance which minimized third order aberrations. An aperture mask 190 is introduced close to or included on concave surface 121 of grating 120. The aperture mask 190 limits the NA of the spectrometer to that which is grater than NA of the entrant rays. So conceived aperture mask 190 impedes the propagation of stay polychromatic entrant rays towards object or image planes 101 and 102 respectfully by means of absorption. Additionally aperture mask 190 prevents said stray polychromatic entrant rays from impinging on concave grating surface 121 beyond the clear aperture of grating 120 where surface defects and edge chamfer reside thus preventing propagation or generation of stray light. Still another aspect of aperture mask 190 is to prevent specular reflected rays 165 of impinging rays 160 on convex surface 117 from propagating toward object and image planes 101 and 102 respectfully. Object aperture 105 and image aperture 111 are placed at radial distance 137 from optical axis 103 shown in FIG. 12 along which the image quality is optimized. There is therefore a desire to maximize the cord length of radii 137 that intersects image aperture 111 to provide the highest quality of image within image aperture 111. For a given entrant ray path within object aperture 105 the dispersion axis 135 intersects radii 137 of high image quality. By symmetry zero order image 110 of object aperture 105 also falls incident at radial distance 137 from optical axis 103. Therefore, per this invention zero order image 110, object and image aperture 105 and 111 are all substantially at same radial distance 137 from optic axis 103. A unique aspect of this geometry provides a means for polychromatic entrant rays of object aperture 105 to be reflected off the internal concave surface 117 of lens 115 and directed away from image aperture 111 as reflected rays 166 of FIG. 10. The result of this geometry is a reduction in stray light impinging on image aperture 111. The radial distance of 137 and diameter of lens 115 are selected so as marginal rays originating from object aperture 105 do not intersect optical axis 103 but can propagate through the convex surface 117. This dictates a minimum diameter for radial distance 137 at substantially half that of the diameter of lens 115. Furthermore, the marginal rays determine the required clear aperture of grating 120 and subsequently the inside diameter of aperture mask 190. Judicial selection of optical parameters, by those skilled in the art, must be made therefore to obtain a desired spectral and spatial dispersion of light and operating numerical aperture. The optical parameters include and but are not limited to the materials, dimensions, and radii of the optical components as well as groove density of grating 120 spatial location of components per the context of this disclosure. Optical parameters so selected provide a concentric spectrometer that eliminates specular reflected rays 165 from propagating the optical system of a specular mitigating concentric spectrometer 100 as disclosed in FIG. 10 and FIG. 11.

Figure 13:
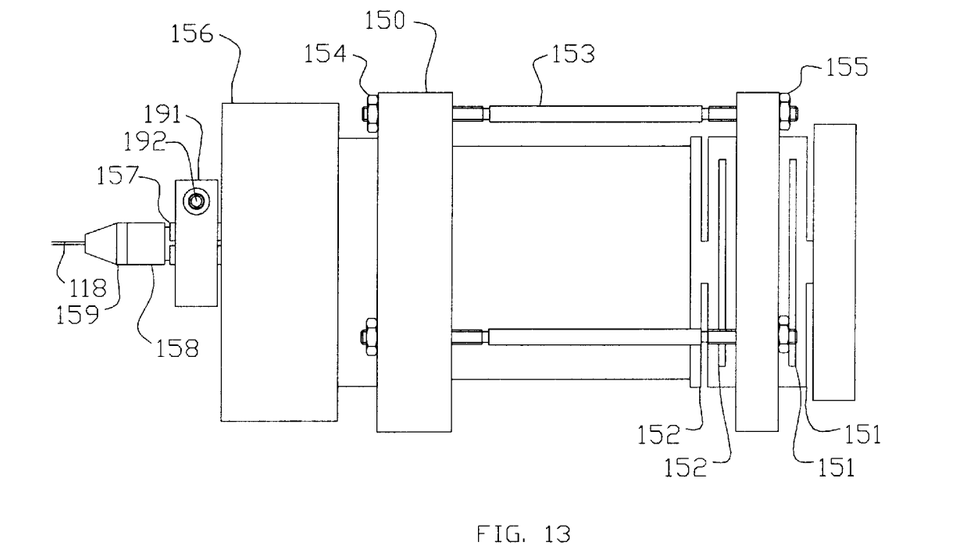
FIG. 13 is a top plan view (x-z plane) of apparatus for implementation of the preferred embodiment.
Figure 14:
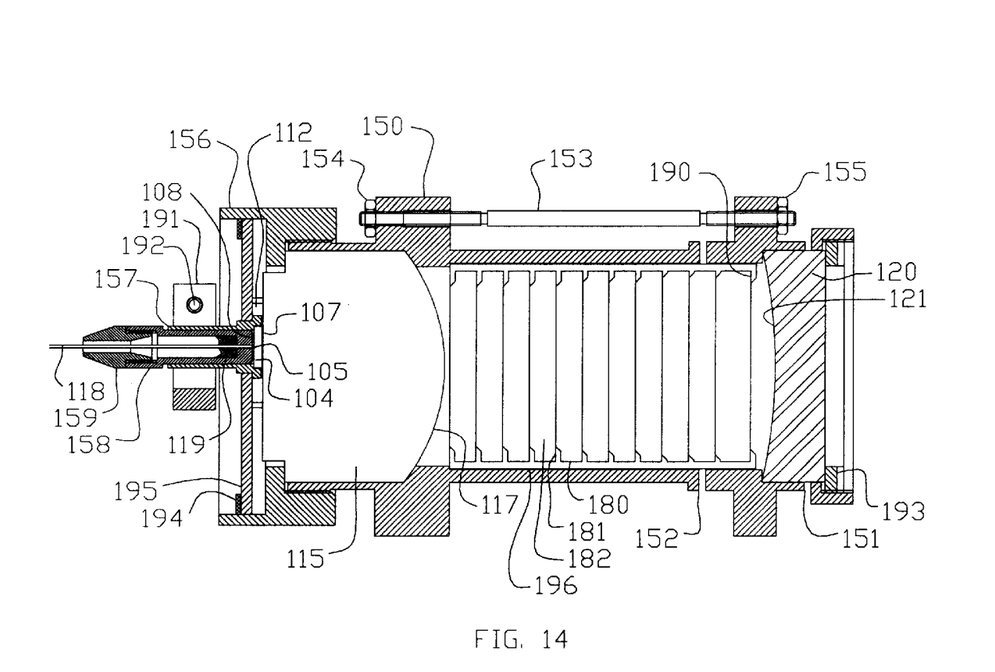
FIG. 14 is a section view of FIG. 13 showing details therein of the preferred embodiment of the present invention.

One implementation of the preferred embodiment of present invention is shown in FIG. 13 and FIG. 14. External view FIG. 13 shows light entering spectrometer 100 through optical fiber 118 of integral fiber optic assemble which includes fiber connector 158 and strain relief 159. Optical fiber 118 is attached to fiber connector 158 by epoxy adhesive 119. Fiber connector 158 is located by fiber collet 157 and held in place by clamp 191 using screw 192. Spectrometer body 150 provides a means to mount and align optical components and maintain said alignment over a wide operating temperature range. Metering rods 153 are threaded into body 150 and secured at one end by locking nuts 154. The other end of metering rods 153 pass through a flange in spectrometer body 150 to which adjustment nuts 155 are secured. Slots 152 permit one end of the spectrometer body 150, preferentially the grating end of the spectrometer, to flex in three degrees of freedom; pitch about the x-axis, yaw about the y-axis, and translation along the z-axis. This provides means to position the grating 120 relative to the all other fixed elements of the embodiment achieving x-y positioning and focus of the spectral image 106 within the image aperture 111. Slots 152 provide additional utility as a thermal expansion joint in spectrometer body 150. Metering rods 153 of sufficiently low coefficient of thermal expansion CTE, such as Invar, maintain the relative position of the lens 115 to grating surface 121 while allowing body 150 to change linear dimension over temperature at slots 152. By proper selection of the affixation points of the metering rods 153 to the spectrometer body 150 by those skilled in the art, changes in focus are sufficiently eliminated over a wide operating temperature range. Slots 151 in spectrometer body 150 are used in conjunction with grating retaining ring 193 of FIG. 14 to place a controlled load on grating 120 and permit rotational alignment of said grating 120 while maintaining contact with spectrometer body 150. Flexure 151 also assures that the contact between grating 120 and body 150 will be maintained over the operating temperature range of the spectrometer.

Another feature of the preferred embodiment is that all alignment adjustments are accessible from one end of the spectrometer making possible in situ alignment of the spectrometer. Plano-convex lens 115 is held in spectrometer body 150 by housing 156. Circuit board 195 locates detector 112 relative to fiber collet 157 and provides a means to supply power to and extract signal from detector 112. Object aperture 105 preferentially takes the form of an optical slit formed by an opaque metal deposition, such as nickel, on optically transparent substrate, such as SCHOTT GLASS TECHNOLOGIES B270 glass, 104 to which optical fiber 118 is abutted. Substrate 104 is attached to end of fiber collet 157 so as to maintain alignment of fiber connector 158 with optical fiber 118 to optical slit 105. Circuit board 195 with attached detector 112 and fiber collet 157 with slit 105 are held against planar surface of lens 115 by means of retaining ring 194. Optical cement 107 of index of refraction nearly equal to that of the substrate 104, detector window of detector 112 and piano-convex lens 115 bonds detector 112 and substrate 104 to lens 115 providing mechanical stability without loss due to specular surface reflections at these optical interfaces. Optical cement 107, such as EPOXY TECHNOLOGIES EPO-TEK 301-2, or others having the desired optical and physical properties can be used. Surface reflections between optical fiber 118 and substrate 104 are similarly eliminated by use of said same optical cement located at 108.

The baffle structure 180 is comprised of a series of individual baffles such as baffle 181 made of or coated with a light absorbent material and may include aperture mask 190 as an integral part thereof. The spacing between individual baffles and the aperture of each baffle or both may be adjusted such that stray light or light which has been reflected from convex lens surface 117 impinges first on a baffle such as 181 then on baffle wall 182. A baffle structure so deployed provides no less than two opportunities for the absorption of stray light, effectively doubling the absorptivity of the material or absorbing media of baffle structure 180. Baffle structure 180 is loosely fit into spectrometer body 150 and held in place by an elastic adhesive such as silicone adhesive 196. The silicone adhesive 196 permits baffle structure 180 to deflect internal to spectrometer body 150 when adjustments are made in pitch and yaw of grating 120 by means adjustment nuts 155 without becoming detached from body 150. Baffle structure 180 also prevents ambient light from entering the spectrometer body 150 through slots 152 in body 150 by blocking the light path created by slots 152.

It will be apparent to those skilled in the art that the optical axis may be altered by the introduction of plane reflecting surfaces, such as fold mirrors or prisms, along the optical path to obtain a desired spatial orientation of components. Regardless of the angle or number of reflecting surfaces it can be shown that when the optical axis is rendered as a straight line, as an optical tunnel diagram, the rays path through the spectrometer relative to the optical axis remains unchanged and is within the scope of this invention.

A concentric spectrometer that mitigates internal specular reflection is thus realized providing high quality spectral images not limited by optical phenomenon created by the reflection of light by internal optical surfaces.

The detailed embodiments disclosed herein may be accomplished in a variety of forms without departing from the scope or intent of this invention by those skilled in the art and is not limited to the disclosed embodiments but should be defined by the claims which follow.

What is claimed is:

1. A concentric spectrometer which mitigates internal specular reflections, said spectrometer comprising:
   (a) an optical axis;
   (b) a radial distance perpendicular to said optical axis;
   (c) an object aperture located substantially at said radial distance from said optical axis;
   (d) an image aperture located substantially at said radial distance from said optical axis;
   (e) a plurality of non-planar optical surfaces having centers of curvature which are substantially common on said optical axis; wherein said plurality of non-planar optical surfaces includes at least one grating surface which is aplanatic for zero order of diffraction; wherein said plurality of non-planar optical surfaces includes at least one convex refracting surface; and
   (f) a plurality of planar optical surfaces substantially coincident with the centers of curvatures of said plurality of non-planar optical surfaces and are substantially perpendicular to said optical axis.

2. The spectrometer of claim 1 further comprising an aperture mask positioned at said grating surface.

3. The spectrometer of claim 2 wherein said aperture mask prevents the propagation of light beyond the clear aperture of said grating surface.

4. The spectrometer of claim 3 wherein said aperture mask does not impede the propagation light that would contribute to the formation of spectra at said image aperture.

5. The spectrometer of claim 1 further comprising a plurality of light absorbing baffles between said refracting surface and said grating surface.

6. The spectrometer of claim 5, wherein said light absorbing baffles absorb light which does not contribute to the formation of spectra by impingement on said baffles no less than two times.

7. The spectrometer of claim 1 wherein at least one of said surfaces is substantially coincident with said object aperture.

8. The spectrometer of claim 1 wherein at least one of said planar optical surfaces is substantially coincident with said image aperture.

9. The spectrometer of claim 1 wherein said object aperture includes one or more apertures through which polychromatic light enters said spectrometer.

10. The spectrometer of claim 9 further comprising an aperture mask for preventing the propagation of diffracted light reflected from the specular surface of said convex surface of said plano-convex lens.

11. The spectrometer of claim 1 wherein images of said object aperture are formed within said image aperture spatially dispersed by wavelength along the axis of dispersion substantially perpendicular to the grooves of said grating surface.

12. The spectrometer of claim 1 wherein one said planar optical surface and one said non-planar optical surface form a plano-convex lens of index of refraction higher than of that media that separates the convex surface of the lens and said grating surface.

13. The spectrometer of claim 12 wherein the convex lens surface of said plano-convex lens and said grating surface are spatially separated along said optical axis to advantage of best image formation of diffracted object within said image aperture at said radial distance from said optical axis.

14. The spectrometer of claim 13 further comprising light absorbing baffles which absorb diffracted light reflected from the specular surface of said convex surface of said plano-convex lens.

15. The spectrometer of claim 14 wherein said light absorbing baffles absorb light beyond the clear aperture of said grating surface.

16. The spectrometer of claim 12 wherein said planar surface of said plano-convex lens may include either object aperture or image aperture or both.

17. The spectrometer of claim 1 wherein the radii of said radial distance is sufficient to cause light diffracted from said grating surface to reflect from specular surface of said refracting surface to exclude impingement on said grating surface.

18. The spectrometer of claim 17 wherein said radial distance substantially includes said object aperture and said image aperture and zero order of diffraction.

19. The spectrometer of claim 1 wherein the non-planar optical surfaces are substantially spherical.

* * * * *